April 26, 1949.   M. J. SCHAEFFER   2,468,116
DIRECTION FINDER
Filed March 6, 1945
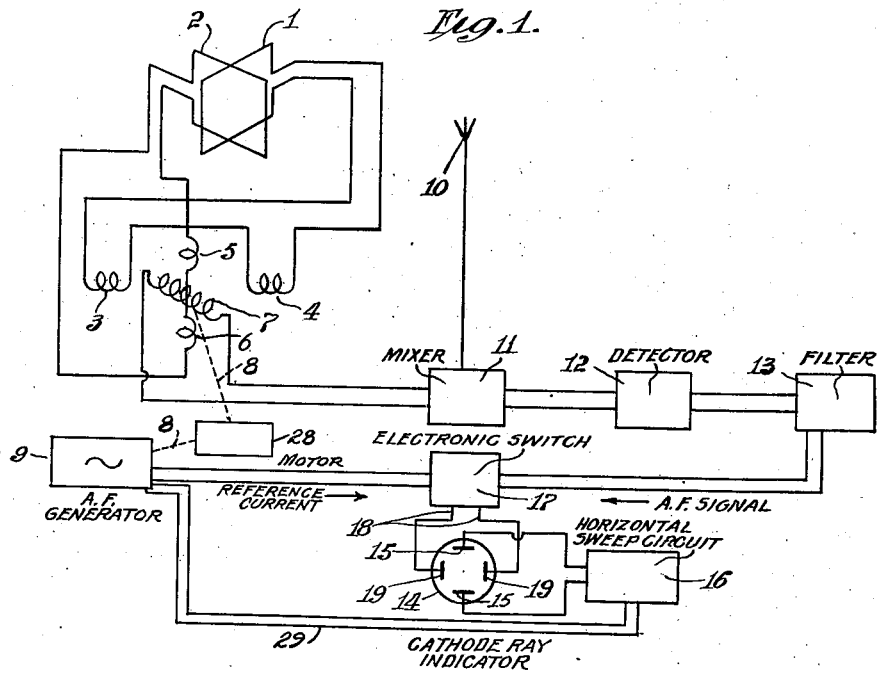
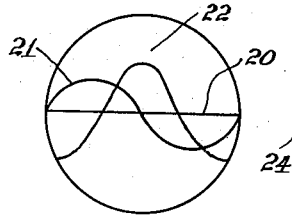
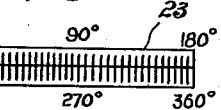
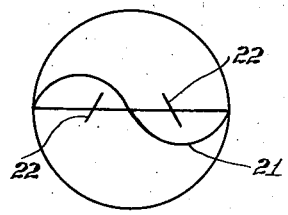
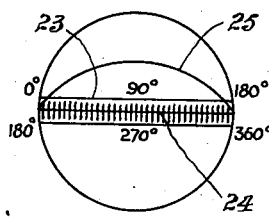
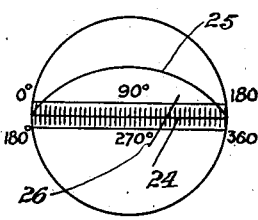
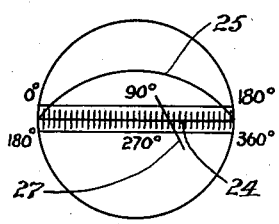
INVENTOR
MARTIN J. SCHAEFFER
BY
ATTORNEY Patented Apr. 26, 1949

2,468,116

UNITED STATES PATENT OFFICE 2,468,116

DIRECTION FINDER

Martin J. Schaeffer, East Orange, N. J., assignor to Federal Telephone and Radio Corporation, New York, N. Y., a corporation of Delaware Application March 6, 1945, Serial No. 581,238

6 Claims. (Cl. 343—118)

This invention relates to a direction finder of the radio goniometer type.

One object of this invention is to provide a direct reading direction finder in which no continuous manual adjustment of the goniometer is required.

Another object of this invention is to provide a direction finder in which the bearing indications are given substantially instantaneously and automatically.

Yet a further object of this invention is to provide an automatic and direct reading direction finder in which the sense of direction is instantaneously and automatically indicated, so that no 180° ambiguity exists.

Still another purpose of this invention is to provide a direction finder in which the usual sources of error are eliminated or substantially balanced out, without the necessity of continuing adjustments on the part of the operator, after initial settings have once been made.

Another object of this invention is to provide an automatically indicating direction finder in which the indication is given instantaneously as a single, relatively short and narrow line, intersecting a sharply defined scale and reading directly thereupon in angular degrees of bearing.

Reference is now made to the accompanying drawings wherein:

Fig. 1 is a schematic showing of one embodiment of a direction finder according to this invention;

Fig. 2 represents the indicating screen of the direction finder of Fig. 1, indicating the complete traces that are initially produced thereon;

Fig. 3 shows the same screen as in Fig. 2, but with undesired portions of one trace blanked out;

Fig. 4 shows one form of transparent scale which may be used with the indicating screen of Figs. 2 and 3;

Fig. 5 shows one form of completely assembled indicating screen and scale, as it appears when no signals are being received;

Fig. 6 shows the screen and scale assembly of Fig. 5, as it appears when indicating a bearing less than 180°; and Fig. 7 shows the screen and scale assembly of Fig. 5, as it appears when indicating a bearing greater than 180°.

In Fig. 1, the goniometer proper is constituted by two crossed loops 1 and 2. These loops are arranged to lie in mutually perpendicular planes and are constructed in any suitable conventional manner. The output of loop 1 is fed to a pair of stator coils 3 and 4, while the output of loop 2 is fed to a similar pair of stator coils 5 and 6.

Search coil 7 is arranged to rotate in the composite field produced by the four stator coils just mentioned. The arrangement just described is well known in the goniometer art and detailed description thereof is not necessary. The output of the goniometer, which may be looked upon as a balanced modulator, will be a modulated wave comprising only the sidebands, with suppression of the carrier. The frequency of modulation will be a function of the rate at which the goniometer is rotated. For reasons hereinafter explained in detail, search coil 7 and a generator 9 are mechanically coupled, to a motor 28 as indicated by dotted lines 8, so as to rotate synchronously therewith. This generator produces an alternating current of suitable audio frequency and preferably of as pure sine wave form as possible.

It is evident that the respective output currents of generator 9 and of search coil 7 will both be modulated at an identical audio frequency. However, for all bearings except 0°, 180° and 360°, there will exist a phase difference between the respective output currents just referred to, and this phase difference will be a function of the bearing of the signal picked up by loops 1 and 2.

In order to provide an indication without 180° ambiguity, there is provided an additional signal pickup element, so arranged as to constitute a so-called source of sense voltage. Such an arrangement may comprise a unilateral antenna 10, Fig. 1, either vertical or horizontal, but may be any other convenient signal source of this type, as well known in the direction finder art. The outputs of search coil 7 and antenna 10 are respectively fed to a mixer 11, such mixer being of any suitable well-known type. The resultant, produced in the mixer, of a combination of the two currents received from the two sources, will be a modulated wave having a carrier frequency corresponding to that of the signal reaching the antenna and being modulated at a frequency which is a function of the angular velocity of the goniometer search coil.

The modulated wave obtained from the output of mixer 11 is fed to a detector 12, so as to yield the modulating frequency. This modulating frequency is passed through a suitable filter 13, thereby yielding a current of audio frequency only. The audio frequency signal derived from filter 13 and the audio frequency current derived from generator 9 have, respectively, identical frequencies, but also have a phase difference there-between determined by the bearing of the signal received on the goniometer, the sign of this phase difference being determined by the signal derived from the source of sense voltage. Looked at from another viewpoint, the current derived from generator 9 is of known phase, of frequency identical with the frequency of the bearing indication voltage and has a definite phase relationship with respect to the position of the goniometer search coil 7. Therefore the current from generator 9 may be considered as a standard or reference current as regards frequency and phase.

In order to compare and automatically to indicate the phase relationships between these two audio frequency currents, there is provided an oscilloscope 14, preferably of the cathode ray or electronic type. The oscilloscope is provided with mutually perpendicular sets of deflection plates or coils, as well known in the art. One set of plates 15 is connected to a horizontal sweep circuit 16. This sweep circuit furnishes a linear horizontal sweep synchronized with reference to the current derived from generator 9 as shown by input lead 29. Devices and methods for actuating and controlling such sweep circuit are well known in the art and detailed description thereof is not needed.

The combination of the previously described audio frequency currents, so as to afford the desired indication on the screen of the oscilloscope is accomplished by a switch 17, preferably of the electronic type. This switch is arranged so that the output leads 18 thereof are supplied in sequence with three different currents, namely, reference current from generator 9, signal current from filter 13, and current of zero voltage. This switch may be of any convenient type whose sequential switching of the signals from 9, 13 and self-contained zero deflection source to line 18 may be controlled manually or else synchronized with the motor 28, as well known in the art. When the output of switch 17 is fed to the other pair of deflection plates 19 of oscilloscope 14, there will appear on the screen, when direction-bearing signals are being received, a pattern of the type shown in Fig. 2.

In Fig. 2 the horizontal line 20 is produced when switch 17 is yielding an output of zero voltage and the horizontal sweep circuit 16 synchronized with the generator 9 is made to sweep at half the frequency of the signals from generator 9, sine wave 21 is produced when this switch is furnishing to leads 18 the voltage derived from generator 9, and sine wave 22 is produced when switch 17 connects the signal received from filter 13 to the oscilloscope. The phase difference between traces 21 and 22 represents the angular bearing of the signal received by the goniometer loops, so that precise indication of the radio bearing may easily be obtained if means are provided for indicating the magnitude of this phase difference.

In Fig. 3 all portions of trace have been blanked out, by any suitable means, except those portions where the wave trace crosses horizontal axis 20. These intersections of traces 20 and 22 afford definite and sharply defined points of reading, as hereinafter explained.

In Fig. 4 is shown a transparent, or translucent, scale 23 having thereupon two sets of gradations, the upper portion of the scale reading from 0° to 180° and the lower portion reading from 180° to 360°, the dividing line 24 between these two portions being horizontal. This transparent scale is mounted upon the oscilloscope screen so that division line 24 and horizontal trace 20 may be made coincidental, as indicated in Fig. 5.

In order to produce trace 25, as seen in Fig. 5, Fig. 6 and Fig. 7, the controls of the oscilloscope governing horizontal amplification and horizontal and vertical centering are adjusted to cause trace 20 to assume the desired position, coincidental with scale division line 24. Then, trace 21 representing the standard or reference audio frequency and voltage is applied to the oscilloscope, and the vertical amplification and sweep frequency controls are adjusted until exactly one-half of a complete cycle 25 appears on the screen and the two points where this half cycle meets horizontal base line 24 are made to coincide with the two extremities of the horizontal line, i. e. with 0° and 180°. It may be necessary to readjust the control during this process by methods well known in the art. Finally only one lateral half of the patterns 25 shown in Fig. 2 and Fig. 3 is seen on the screen.

It is now assumed that a radio-bearing signal is picked up by the goniometer, thereby giving rise to the phase displaced audio frequency current previously described. This signal current, after identification as to sense direction, detection and filtration, is supplied by switch 17 to the oscilloscope. Due to the blanking out of portions of the trace 22, which represents this signal, there will appear upon the screen, in addition to the horizontal and reference traces, only a single narrow line 26, intersecting horizontal trace 20 and representing the portion of trace 22 which has not been blanked out. In Fig. 9, the slope of line 26 relative to horizontal line 24 indicates that the phase difference between reference and signal voltages is positive in sign. This slope then affords an indication that the upper portion of scale 23 is to be read, i. e. that the bearing lies between 0° and 180°.

In Fig. 7, scale-intersecting line 27 represents the portion of a signal wave similarly received and partially blanked out. In this case, the reverse slope of the line indicates a negative phase difference between reference and signal voltages. Therefore, the bearing is to be found upon the lower portion of scale 23, i. e. between 180° and 360°.

In operating a direction finder according to this invention, the audio frequency generator and goniometer search coil, rigidly coupled together mechanically, are kept in continuous rotation when a bearing is being taken. It will be evident that precise speed control of the audio frequency generator is required only to the extent that may be demanded by filter 13 or by control circuits of oscilloscope 14, since the mechanical coupling just referred to assures an identical frequency of signal and reference voltages. The preliminary manual adjustments required are simply those of adjusting the oscilloscope controls until trace 20 and line 24 coincide and until trace 25, in size and position, agrees with the conditions above-described in connection with Fig. 5.

As long as the conditions just described are maintained substantially constant, there is no requirement for any manual adjustment of the device. When a bearing signal of sufficient intensity to actuate the device is received, there will appear upon the oscilloscope screen a short and sharply defined line such as shown at 26 or 27. From the direction of slope of this line, the operator is informed upon which portion of the scale the bearing is to be taken. The intersection point of the signal line and the horizontal scale line then affords a direct reading of the signal bearing. Any alteration of the signal bearing is immediately and automatically indicated by a shift of the sharp indication line along scale 23, without there being any need for manual readjustment of the device by the operator.

While certain embodiments of this invention have been disclosed and certain advantages described, other forms and further advantages will be apparent to those skilled in the art, and the invention is limited only by the scope of the claims hereunto appended.

What I claim is:

1. Direction finder including a goniometer having two loop antennae placed in quadrature, two sets of stator coils placed in quadrature, and a rotatable search coil, an audio frequency generator, means for synchronizing the rotation of said search coil with said generator, a source of sense voltage, a mixer fed by currents from said search coil and said source, a detector fed from the output of said mixer, a filter fed from said detector and delivering a current of identical frequency with the current from said generator but phase displaced relative thereto, to an extent correspondent to the goniometer bearing, a switch connected both to said generator and to said filter and acting to deliver in sequence the respective currents derived from said generator and said filter and zero current, an oscilloscope, means for energizing said oscilloscope, means for producing thereupon a sweep synchronized in one direction with the current derived from said generator, means for deflecting said sweep in a perpendicular direction by the output of said switch, and means upon said oscilloscope for indicating the intelligence conveyed by said deflected sweep.

2. Finder according to claim 1, in which said indicating means comprise a receiving screen and a translucent scale having a median line coinciding with the undeflected sweep on said screen, graduations of angular bearing above and below said median line, means for blanking out all portions of the trace produced by current from said filter except one portion crossing said median line, and means for making one-half a wave length of the trace produced by current from said generator extend from one extremity of said scale to the other extremity thereof comprising said sweep having a frequency equal to half the frequency of said generator, whereby said trace-crossing portion yields upon said scale a direct bearing reading and the slope of said crossing portion indicates which portion of said scale graduations is to be read with respect to said median line.

3. Method of obtaining upon an oscilloscope screen direction bearing from a source of sense current, a goniometer, and an alternator rotating synchronously with said goniometer, and providing an alternating current output including mixing the output of said goniometer with said sense-indicating current, detecting and filtering said mixed currents, producing on said screen an undeflected sweep trace synchronized with the output of said alternator, sequentially deflecting said sweep to produce a first trace indicating one-half of one wave length of said alternator output, and to produce a second trace indicating at least a portion of one-half of one wave length of said filtered goniometer output, said second trace intersecting said undeflected sweep trace at points corresponding to the direction bearing, measuring the intersection of said undeflected sweep trace and said second trace, whereby the direction bearing of said goniometer is indicated.

4. Direction finder comprising electrical signal receiving means, said receiving means comprising a goniometer output, an oscilloscope, said oscilloscope comprising a viewing screen and first and second deflection plates, a source of electrical sweep signals, a source of low frequency reference signals comprising an alternating frequency generator, means for modulating at an identical frequency the output reference signals of said generator and the signals of said goniometer, means for applying said sweep signals to said first deflection plates to produce a sweep on said viewing screen, means for producing three traces sequentially upon said viewing screen comprising means for sequentially applying to said second deflection plates a first electrical signal producing no deflection of said said sweep, a second signal correspondent to one-half of one wave length of said modulated reference signal, and a third signal correspondent to the modulated goniometer signal, said viewing screen further comprising scale means whereby the mutual relations of said three signals producing three resultant traces indicate the bearing intelligence conveyed by said resultant traces.

5. Direction finder according to claim 4 further comprising a source of sense voltage, said scale means being translucent and carrying two graduations for indicating the direct bearing and the reciprocal bearing, said scale means so positioned on said screen whereby said third trace intersects both sets of graduation at points correspondent to said goniometer output signal, means for indicating which set of graduations is to be read comprising said source of sense voltage, said indication comprising the slope of said third trace at the points of intersection.

6. Method for measuring phase differences between a reference alternating electrical signal and an alternating electrical signal phase displaced from said reference signal comprising an oscilloscope having a viewing screen and first and second deflection means, and a source of electrical sweep signals synchronized with said reference signal and having a frequency equal to half of the frequency of said reference signal, applying said sweep signals to one set of deflection means, sequentially applying to said second deflection means, said reference signals, said phase displaced signals and a zero sweep-deflection signal, whereby on said screen is produced a first trace indicating one-half of one wave length of said reference signal, a second trace indicating a portion of one-half of one wave length of said phase displaced signal, and a third trace indicating the undeflected sweep trace, said portion intersecting said undeflected sweep trace at points corresponding to the phase displacement, said half cycle reference signal and phase displaced portion being contained within the extremities of said undeflected trace.

MARTIN J. SCHAEFFER.

REFERENCES CITED

The following references are of record in the file of this patent:

UNITED STATES PATENTS

| Number | Name | Date |
| --- | --- | --- |
| 2,183,746 | Hyland | Dec. 19, 1939 |
| 2,206,637 | Koch | July 2, 1940 |
| 2,263,377 | Busignies et al. | Nov. 18, 1941 |
| 2,320,908 | Busignies | June 1, 1943 |
| 2,388,262 | Ganiayre et al. | Nov. 6, 1945 |